(12) United States Patent
Wei et al.

(10) Patent No.: US 8,370,264 B1
(45) Date of Patent: Feb. 5, 2013

(54) SYSTEM AND METHOD OF FULFILLING A TRANSACTION

(75) Inventors: Danny Wei, Seattle, WA (US); Craig W. Howard, Seattle, WA (US); Robert H. Sawers, Seattle, WA (US); David I. Gellman, Seattle, WA (US); Charles L. Ward, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/151,153

(22) Filed: Jun. 1, 2011

Related U.S. Application Data

(63) Continuation of application No. 11/731,812, filed on Mar. 30, 2007, now Pat. No. 7,962,418.

(51) Int. Cl.
G06Q 20/00 (2006.01)

(52) U.S. Cl. .............. 705/65; 705/75; 705/76; 705/68

(58) Field of Classification Search .......... 705/64–65, 705/75–77
See application file for complete search history.

(56) References Cited

U.S. PATENT DOCUMENTS

| | | | |
|---|---|---|---|
| 6,029,141 A * | 2/2000 | Bezos et al. .......... | 705/27.1 |
| 6,345,261 B1 | 2/2002 | Feidelson et al. .......... | 705/14 |
| 6,609,113 B1 | 8/2003 | O'Leary et al. .......... | 705/39 |
| 6,873,974 B1 | 3/2005 | Schutzer .......... | 705/41 |
| 7,213,750 B1 | 5/2007 | Barnes et al. .......... | 235/381 |
| 7,254,557 B1 | 8/2007 | Gillin et al. .......... | 705/40 |
| 7,457,767 B1 * | 11/2008 | Dunsmore et al. .......... | 705/17 |
| 8,073,772 B2 * | 12/2011 | Bishop et al. .......... | 705/39 |
| 8,190,514 B2 * | 5/2012 | Bishop et al. .......... | 705/38 |
| 2002/0072942 A1 * | 6/2002 | Kuykendall et al. .......... | 705/7 |
| 2002/0111907 A1 | 8/2002 | Ling .......... | 705/41 |
| 2003/0097376 A1 * | 5/2003 | Ortega et al. .......... | 707/104.1 |
| 2003/0161335 A1 | 8/2003 | Fransdonk .......... | 370/401 |
| 2004/0078276 A1 | 4/2004 | Shimogori .......... | 705/26 |
| 2004/0078325 A1 | 4/2004 | O'Connor .......... | 705/39 |
| 2004/0111370 A1 | 6/2004 | Saylors et al. .......... | 705/40 |
| 2004/0117300 A1 | 6/2004 | Jones et al. .......... | 705/39 |
| 2004/0117302 A1 * | 6/2004 | Weichert et al. .......... | 705/40 |
| 2004/0133509 A1 | 7/2004 | McCoy et al. .......... | 705/39 |
| 2004/0254835 A1 | 12/2004 | Thomas et al. .......... | 705/14 |
| 2005/0228750 A1 | 10/2005 | Olliphant et al. .......... | 705/40 |
| 2005/0279827 A1 | 12/2005 | Mascavage et al. .......... | 235/380 |
| 2006/0036553 A1 * | 2/2006 | Gupta et al. .......... | 705/52 |

(Continued)

OTHER PUBLICATIONS

Kora McNaughton, "Amazon auction launch boost shares", CNet News, all pages, Mar. 30, 1999. http://news.cnet.com/2100-1017-223611.html.*

(Continued)

*Primary Examiner* — Behrang Badii
*Assistant Examiner* — Calvin Cheung
(74) *Attorney, Agent, or Firm* — Seed IP Law Group PLLC

(57) ABSTRACT

A method is disclosed that includes receiving a request for a transaction from a customer at a seller server system via an electronic-commerce website and identifying a customer account stored at the seller server system based on an identity of the customer. A plurality of financial instruments is associated with the customer account. The plurality of financial instruments has a customer-specific sequence including at least a first financial instrument pre-selected by the customer and a second financial instrument. The method includes automatically attempting to collect a particular payment associated with the transaction from a first financial service provider corresponding to the first financial instrument and automatically attempting to collect the particular payment from a second financial service provider corresponding to the second financial instrument in response to data received at the seller server system indicating a denial of the payment.

26 Claims, 8 Drawing Sheets

U.S. PATENT DOCUMENTS

| | | | | |
|---|---|---|---|---|
| 2006/0206363 | A1* | 9/2006 | Gove | 705/6 |
| 2006/0208060 | A1 | 9/2006 | Mendelovich et al. | 235/379 |
| 2007/0022048 | A1 | 1/2007 | Kingsborough et al. | 705/39 |
| 2009/0037286 | A1* | 2/2009 | Foster | 705/21 |
| 2009/0048968 | A1 | 2/2009 | Bishop et al. | 705/39 |
| 2009/0119207 | A1* | 5/2009 | Grecia | 705/40 |
| 2011/0106668 | A1* | 5/2011 | Korosec et al. | 705/30 |

OTHER PUBLICATIONS

Kane, M., "E-wallets get a boost from Amazon," Aug. 28, 2002, retrieved on Aug. 13, 2009, from http://news.com.com/2100-1017-955420.html., 4 pages.

Kane, M., "The e-wallet: how it works," Aug. 29, 2002, retrieved on Feb. 11, 2007, from http://networks.silicon.com/webwatch/0,39024667,11035313,00.htm, 3 pages.

Zhao, Y., et al., "An Efficient and Divisible Payment Scheme for M-Commerce," Lecture Notes in Computer Science, 2005, retrieved from http://www.springerlink.com/content/6hn22ark79ppm7b5/fulltext.pdf, 9 pages.

Paypal—User Agreement for PayPal Service, last indicated document modification date Jan. 10, 2007, 24 pages.

Smart Computing—Using CyberCash, Banking, Sep. 1999, vol. 5, Issue 9, retrieved on Aug. 13, 2009, from http://www.smartcomputing.com/Editorial/article.asp?article=article..., 5 pages.

\* cited by examiner

SYSTEM AND METHOD OF FULFILLING A TRANSACTION

CROSS-REFERENCES TO RELATED APPLICATIONS

This application is a continuation of co-pending U.S. patent application Ser. No. 11/731,812, filed Mar. 30, 2007 and entitled "System and Method of Fulfilling a Transaction", which is hereby incorporated herein by reference.

FIELD OF THE DISCLOSURE

The present disclosure is generally related to fulfilling electronic commerce-based transactions.

BACKGROUND

Electronic commerce provides consumers with a convenient way to purchase goods and services. In some cases, a customer can choose to have an online retailer maintain data related to a credit card to avoid re-entering the data each time the customer makes a purchase using the retailer's website. The retailer's ability to collect payment using the stored data may be prevented if the customer cancels the credit card, for example, but does not update the payment information stored by the retailer. Nonetheless, it may be difficult or inconvenient for the customer to update such payment information or to recall that such payment information needs to be updated with the retailer. Moreover, the retailer may risk losing a sale if it requires the customer to separately enter data regarding another payment method before fulfilling a particular transaction. Hence, there is a need for an improved system and method of fulfilling a transaction.

SUMMARY

Figure 1:
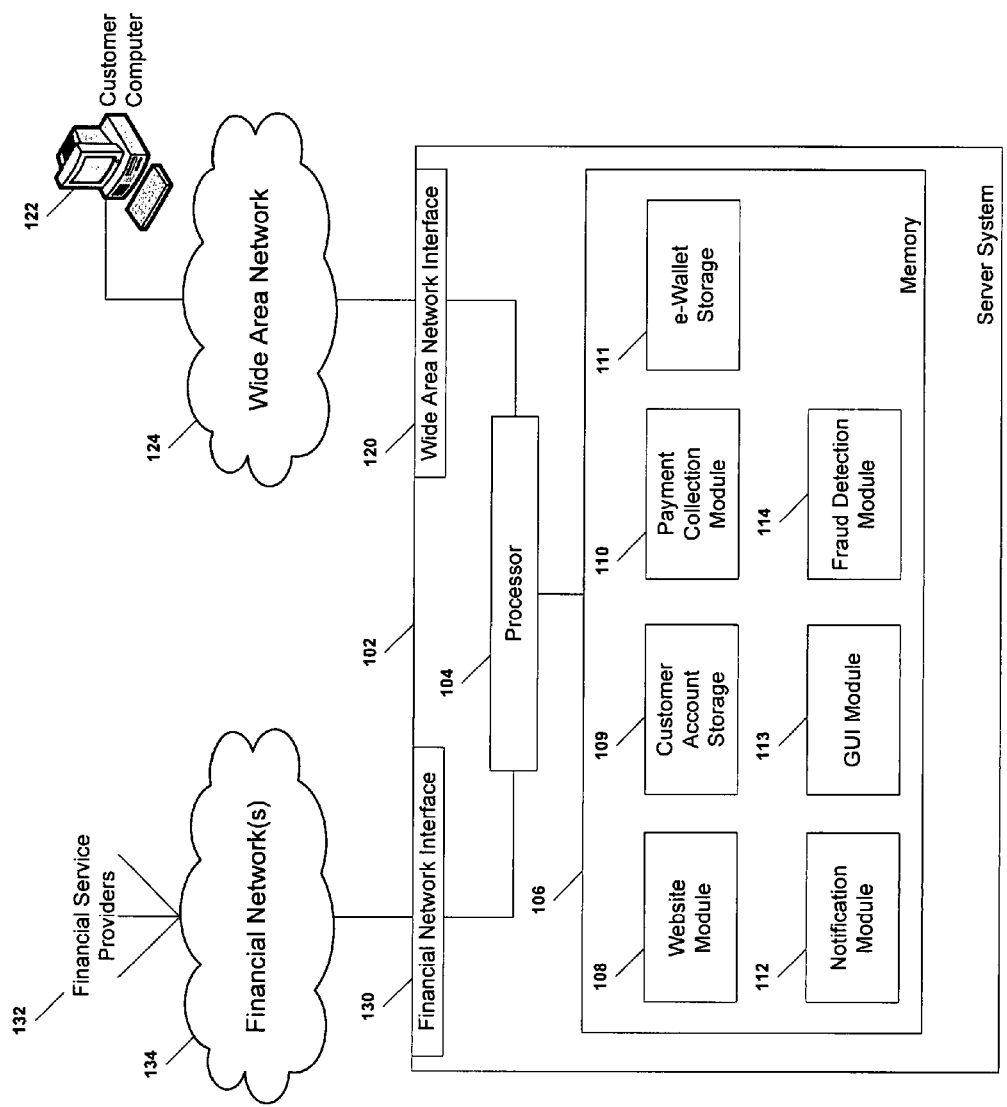
FIG. 1 is a block diagram of a particular embodiment of a system to fulfill a transaction.

A system to fulfill a transaction is disclosed and comprises a server system that includes logic to provide access to an electronic-commerce website via a wide area network and to receive a request for a first transaction from a customer via the electronic-commerce website. The server system also includes logic to access an electronic wallet based on an identity of the customer from a memory of the server system that is accessible to the logic. The electronic wallet includes data related to a plurality of financial instruments associated with the customer. The plurality of financial instruments has a customer-specific sequence including at least a first financial instrument pre-selected by the customer and a second financial instrument pre-selected by the customer. The server system also includes logic to send a first request for a payment associated with the first transaction to a first financial service provider corresponding to the first financial instrument via a financial network interface of the server system. The server system also includes logic to automatically send a second request for the payment to a second financial service provider corresponding to the second financial instrument via the financial network interface, in response to data indicating a denial of the payment.

In another particular embodiment, a system to fulfill a transaction is disclosed that comprises a server system including logic and memory accessible to the logic. The memory includes a data store to store data related to a first financial instrument, where the data is provided by a customer in conjunction with a first transaction. The memory also includes instructions executable by the logic to receive and store data related to a second financial instrument of the customer in conjunction with a second transaction. Further, the memory includes instructions executable by the logic to determine whether to collect a particular payment associated with the first transaction from a second financial service provider corresponding to the second financial instrument.

In another particular embodiment, a method of fulfilling a transaction is disclosed that includes receiving a request for a transaction from a customer at a seller server system via an electronic-commerce website. The method also includes identifying a customer account stored at the seller server system based on an identity of the customer. A plurality of financial instruments is associated with the customer account. The plurality of financial instruments has a customer-specific sequence including at least a first financial instrument pre-selected by the customer and a second financial instrument pre-selected by the customer. The customer-specific sequence comprises an order in which payments are to be requested from financial service providers corresponding to at least some of the plurality of financial instruments. The method includes automatically attempting to collect a particular payment associated with the transaction from a first financial service provider corresponding to the first financial instrument and automatically attempting to collect the particular payment from a second financial service provider corresponding to the second financial instrument in response to data received at the seller server system indicating a denial of the particular payment by the first financial provider.

In another particular embodiment, a method of fulfilling a transaction is disclosed that includes attempting, at a first time, to collect a payment associated with a first transaction using data related to a first financial instrument associated with a customer account. The transaction corresponds to a first offering of an electronic-commerce website. The method also includes automatically attempting, at a second time, to collect payment for the first transaction using data related to a second financial instrument associated with the customer. The data related to the second financial instrument is retrieved from memory and was originally received from the customer in connection with a second transaction related to a second offering of the electronic-commerce website.

In another particular embodiment, a method of fulfilling a transaction is disclosed that includes providing a first graphical user interface (GUI) to create an electronic wallet via a seller website. The first graphical user interface (GUI) includes a sequence of virtual slots. Each of the virtual slots is configured to receive data related to one of a plurality of financial instruments designated by a customer. Payment for a particular transaction is to be requested by the seller from a financial service provider associated with each of the plurality of financial instruments according to the sequence of the virtual slots.

Detailed Description of the Drawings

Referring to FIG. 1, a particular embodiment of a system to fulfill a transaction is illustrated and designated generally 100. The system 100 includes a computer server system 102. The server system 102 includes logic, such as a processor 104, and a memory 106 that is accessible to the logic. In one embodiment, the server system 102 includes a single computer server, such as a web server. Alternatively, the server system 102 includes multiple servers that independently or redundantly include logic and memory adapted to provide one or more functions with respect to fulfilling electronic commerce-based transactions.

The server system 102 also includes a first network interface 120 to communicate with end-user computing devices, such as the illustrated customer computer 122, via a wide area network 124, such as the Internet. Further, the server system 102 includes a second network interface 130 to communicate with one or more financial service providers 132 via one or more financial networks 134. For example, the server system 102 can communicate with banks, credit card providers, debit card providers, money transfer service providers, other financial service providers, or any combination thereof, via the financial network(s) 134. In one embodiment, the financial network(s) 134 includes a credit card network, an automated clearinghouse (ACH) network, a clearinghouse interbank payment system (CHIPS) network, an electronic bill presentment and payment (EBPP) network, an electronic funds transfer (EFT) network, another financial network, or any combination thereof.

The memory 106 includes a plurality of modules 108-114, each of which can facilitate one or more functions of the server system 102 with respect to fulfilling electronic commerce-based transactions. In a particular embodiment, the modules 108-114 include processor-executable instructions. For instance, the modules 108-114 may include instructions that together comprise one or more software applications or other computer programs. In an alternative embodiment, one or more of the modules 108-114 include hardware logic adapted to perform one or more functions of the server system 102.

In a particular embodiment, the memory 106 includes a website module 108 that is executable by the processor 104 to provide customer access to an electronic commerce website of a seller, such as a wholesaler or retailer, via the wide area network 124. For example, a customer using the customer computer 122 accesses the seller website via the wide area network 124 using a web browser. In one embodiment, the seller website displays offers of products, services, subscriptions, auctions, or any combination thereof. An example of a seller website is Amazon.com.

The website module 108 is executable by the processor 104 to receive a request for a transaction from the customer computer 122 via the seller website. The transaction includes the purchase of one or more products offered via the seller website, the purchase of one or more services offered via the seller website, the purchase of one or more subscriptions via the seller website, one or more bids related to auction items offered via the seller website, or any combination thereof.

In response to the transaction request, the processor 104 determines an identity of the customer and accesses customer account storage 109 to identify a customer account based on the identity of the customer. In a particular embodiment, the identity of the customer is determined by requesting identity information that was originally received from the customer during creation of the customer account. For instance, the website module 108 is executable by the processor 104 to require receipt of a customer user name, a customer password or other authentication token, an answer to a security question, a zip code, at least part of a social security number, other identification information, or any combination thereof, before a requested transaction may proceed. The processor 104 identifies a customer account associated with the information at the customer account storage 109. In another example, the website module 108 is executable by the processor 104 to determine an Internet Protocol (IP) address associated with the customer computer 122, and the processor 104 identifies a customer account associated with the IP address at the customer account storage 109.

In a particular embodiment, the memory 106 includes a payment collection module 110 that is executable by the processor 104 to electronically collect one or more payments related to the requested transaction. For product purchases, the payment collection module 110 is executable by the processor 104 to collect a one-time payment or to track and collect multiple installment payments over time. With respect to subscriptions, the payment collection module 110 is executable by the processor 104 to collect a one-time payment or to track and collect periodic subscription payments over time. Further, the payment collection module 110 is executable by the processor 104 to track and collect auto-renewal payments or other recurring payments for a membership service, a preferred customer service, a shipping discount service, or other services.

The payment collection module 110 is executable by the processor 104 to collect a payment associated with a requested transaction by identifying a financial instrument associated with the customer account and by sending a request for the payment to a financial service provider corresponding to the financial instrument via the financial network (s) 134. A financial instrument includes, for example, a gift card, a gift certificate, a credit card, a bank account, a debit card, an online financial account, or a payphrase. In a particular embodiment, if no other financial instruments are associated with the customer account, the server system tries to collect payment from the first financial provider again at a pre-defined time interval up to a maximum number of tries. For example, the server system can retry such payment collection once per day, up to three times.

In another particular embodiment, a plurality of financial instruments is associated with the customer account identified by the server system 102. The payment collection module 110 is executable by the processor 104 to send a request for the payment to a first financial service provider corresponding to a first one of the plurality of financial instruments, such as a financial instrument designated by the customer at the time of the first transaction, a preferred financial instrument pre-selected by the customer, or a financial instrument pre-selected by the customer as first in a customer-specific sequence of financial instruments. The payment collection module 110 is executable by the processor 104 to receive the payment from the first financial service provider and to transfer monies associated with the payment to one or more accounts.

In addition, the payment collection module 110 is executable by the processor 104 to send a second request for the payment to a second financial service provider corresponding to a second one of the plurality of financial instruments associated with the customer account in response to data indicating a denial of the payment by the first financial service provider. The second financial instrument includes a default financial instrument pre-selected by the customer account, a backup financial instrument pre-selected by the customer, a financial instrument used to collect payment for a different transaction associated with the customer (e.g., a prior transaction at the seller website), or a financial instrument pre-selected by the customer as second in a customer-specific sequence of financial instruments. The payment collection module 110 is executable by the processor 104 to request the payment from financial service providers corresponding to at least one more of the plurality of financial instruments, such as a third financial service provider corresponding to a third financial instrument, until payment is received or until the plurality of financial instruments, or a pre-determined number thereof, are exhausted.

In one embodiment, the second financial instrument is a financial instrument used by the customer to submit payment for a subsequent second transaction via the seller e-commerce website. For example, the website module 108, the payment collection module 110, or any combination thereof, is executable by the processor 104 to receive information related to a first financial instrument, such as a credit card, that the customer would like to use to pay for a first transaction corresponding to a first offering of the e-commerce website, such as a preferred customer service. In a particular embodiment, multiple payments, such as auto-renewal payments, are associated with the first transaction. The customer may subsequently use a second financial instrument, such as an online financial account, for a transaction that corresponds to a second offering of the e-commerce website, such as the purchase of a product via the seller website, before the expiration of the preferred customer service, and data related to the online financial account is stored at the memory 106 (e.g., at the customer account storage 109).

In a particular embodiment, the server system 102 attempts, at a first time, to collect a particular payment associated with the first transaction, such as an annual auto-renewal payment that comes due after the second transaction has been completed. For instance, the payment collection module 110 is executable by the processor 104 to send a request for the particular payment to a financial service provider associated with the credit card, or to a payment clearinghouse or other payment service communicating with the first financial service provider. The server system 102 receives the particular payment, or the server system 102 receives data indicating that the particular payment is denied by the first financial service provider associated with the credit card (e.g., due to expiration, reported theft or misplacement, cancellation by the customer, exceeding a spending limit, or a customer restriction of online transactions). If the server system 102 receives data indicating that the payment has been denied, the payment collection module 110 is executable by the processor 104 to retrieve from the memory 106 the data associated with the online financial account that was originally received in connection with the second transaction. The payment collection module 110 is executable by the processor 104 to automatically request, at a second time, the payment from a second financial service provider associated with the online financial account.

In another embodiment, the second financial instrument is a financial instrument used by the customer to submit payment for a prior second transaction via the seller website. For example, the website module 108, the payment collection module 110, or any combination thereof, is executable by the processor 104 to receive information related to a first financial instrument, such as a gift card, that the customer would like to use to pay for a first transaction, such as the purchase of an auction item. The customer may have previously provided data related to a second financial instrument, such as a checking account, to make payments for a subscription service, and data related to the second financial instrument is stored at the memory 106, e.g., at the customer account storage 109.

If a payment associated with the auction item is denied by a first financial service provider associated with the gift card, the payment collection module 110 is executable by the processor 104 to access the data associated with the checking account at the memory 106. The server system 102 requests the payment associated with the auction item from a second financial service provider corresponding to the checking account. In an illustrative, non-limiting embodiment, the payment collection module 110 is executable by the processor 104 to determine whether attempts by the server system 102 to collect payments using the checking account within a pre-defined time period have been successful, before sending a request for payment related to the auction item to the second financial service provider.

In another illustrative embodiment, the second financial instrument can be one of a plurality of financial instruments that comprise an electronic wallet (e-Wallet) configured by the customer and stored at the customer account storage 109, the e-Wallet module 111, or any combination thereof. The e-Wallet includes data items related to the plurality of financial instruments. Further, the e-Wallet indicates a customer-specific sequence in which payment for a requested transaction is to be requested from financial service providers corresponding to the plurality of financial instruments. In a particular embodiment, data associated with the e-Wallet includes notification preferences, other preferences, or any combination thereof, pre-designated by the customer with respect to use of the e-Wallet to collect payments associated with transactions requested via the seller website.

The customer-specific sequence associated with the plurality of financial instruments in the e-Wallet includes at least a first financial instrument pre-selected by the customer and a second financial instrument pre-selected by the customer. In one embodiment, the customer-specific sequence can be designated by the customer. In an alternative embodiment, the e-Wallet module 111 or other aspect of the server system 102 is executable by the processor 104 to determine the customer-specific sequence based on customer data. For example, the server system 102 could identify financial instruments in the e-Wallet that are recently used, frequently used, or any combination thereof, and place them higher in the customer-specific sequence (i.e., closer to a first priority). In addition, the server system 102 could identify financial instruments in the e-Wallet that have been declined in previous transactions and place such financial instruments lower in the customer-specific sequence (i.e., closer to a last priority).

All of the plurality of financial instruments associated with the e-Wallet can be included in the sequence, or less than all of the plurality of financial instruments can be included in the sequence. For example, four financial instruments associated with a customer e-Wallet can be pre-selected by the customer as first, second, third, or fourth. Alternatively, a first financial instrument can be pre-selected as preferred, a second financial instrument as backup, and a third financial instrument as default, while a fourth financial instrument can have no designation.

In one example, a customer requests a magazine subscription having multiple monthly payments via the seller website. The server system 102 identifies the customer and accesses an electronic wallet associated with the customer's account. The server system 102 sends a request for each monthly payment to a first financial service provider associated with a first financial instrument, such as a credit card, that has been pre-selected by the customer as part of a customer-specific sequence of financial instruments associated with the electronic wallet. If the server system 102 determines that a failure event has occurred with respect to the first financial instrument, such as determining that a financial network is inoperable, receiving data indicating a denial of one of the monthly payments (e.g., because the credit card has been reported lost, has been reported stolen, has been canceled, has expired, has reached a spending limit, has been restricted as to online transactions), or another failure event, the server system 102 accesses the electronic wallet to identify a second financial instrument pre-selected by the customer as part of the customer-specific sequence of financial instruments. The server system 102 sends a request for the payment to the second financial provider.

In a particular embodiment, if a failure event is determined with respect to the second financial instrument, such as the payment being denied by the second financial provider, the server system 102 sends a request for the payment to a financial service provider corresponding to a third financial instrument. The server system 102 attempts to collect the payment from a financial service provider associated with each of the plurality of financial instruments associated with the electronic wallet, according to the customer-specific sequence, until payment is received or until all or a pre-defined number of the plurality of financial instruments have been exhausted.

In yet another illustrative embodiment, a customer specifies a maximum per purchase amount, a maximum total purchases amount, or any combination thereof, for each financial instrument in the e-Wallet. For example, the customer can designate that no purchase over fifty dollars ($50.00) is to be made using the first financial instrument; that no purchase over one hundred dollars ($100.00) is to be made using the second financial instrument; and that no purchase over two hundred dollars ($200.00) is to be made using the third financial instrument. In this example, the payment collection module 110 is executable by the processor 104 to determine whether a purchase exceeds a customer-defined limit and to attempt to roll an excess amount to the second financial instrument using the customer-specific sequence of financial instruments. Thus, if the customer attempts to purchase an item costing one hundred twenty dollars ($120.00), the payment collection module 110 is executable by the processor 104 to collect $50.00 of the payment via the first financial instrument and $70.00 via the second financial instrument. If payment is denied by the first financial service provider, however, the payment collection module 110 is executable by the processor 104 to collect $100.00 from the second financial service provider and $20.00 from the third financial service provider.

In an illustrative embodiment, the payment collection module 110 is executable by the processor 104 to check an activation status associated with the customer account before sending a request for a payment related to the first transaction to the second financial service provider. For example, the customer can toggle an activation/de-activation status of an e-Wallet or other feature offered by the seller to automatically attempt to collect a payment from one or more other financial service providers in response to a denial of payment from a first financial service provider.

Figure 7:
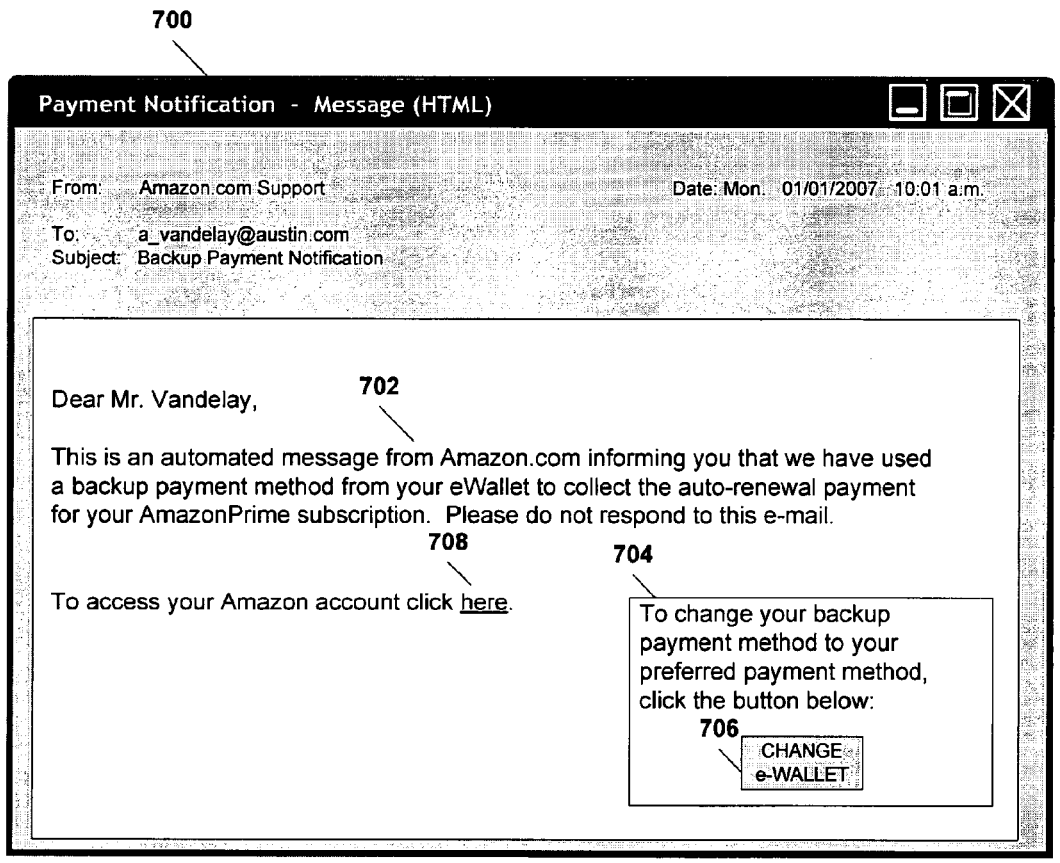
FIG. 7 is a diagram of a particular embodiment of a graphical user interface to present a notification regarding an electronic wallet.

In a particular embodiment, the memory 106 includes a notification module 112 that is executable by the processor 104 to send a notification to the customer regarding the collection of payment for the first transaction from a financial service provider other than the first financial service provider. An example of such a notification is illustrated in FIG. 7. In one embodiment, the notification module 112 is executable by the processor 104 to send or not send such a notification based on customer preferences associated with the customer account. For instance, the customer preferences indicate whether the customer is to be notified when a payment cannot be collected via one of a plurality of financial instruments associated with the customer account; whether the customer is to be notified when a financial instrument other than a first financial instrument pre-selected by the customer is used to collect a payment related to the transaction; whether the customer is to be notified before attempting to collect a payment related to a transaction using a financial instrument other than the first financial service instrument; whether the customer is to be notified after automatically collecting, or attempting to collect, a payment related to a transaction using a financial instrument other than the first financial service instrument; whether notifications should allow the customer to change data related to financial instruments associated with the customer account; whether the customer is to be notified after another event affecting or resulting from the seller's use of the customer's financial instruments; or any combination thereof.

Figure 6:
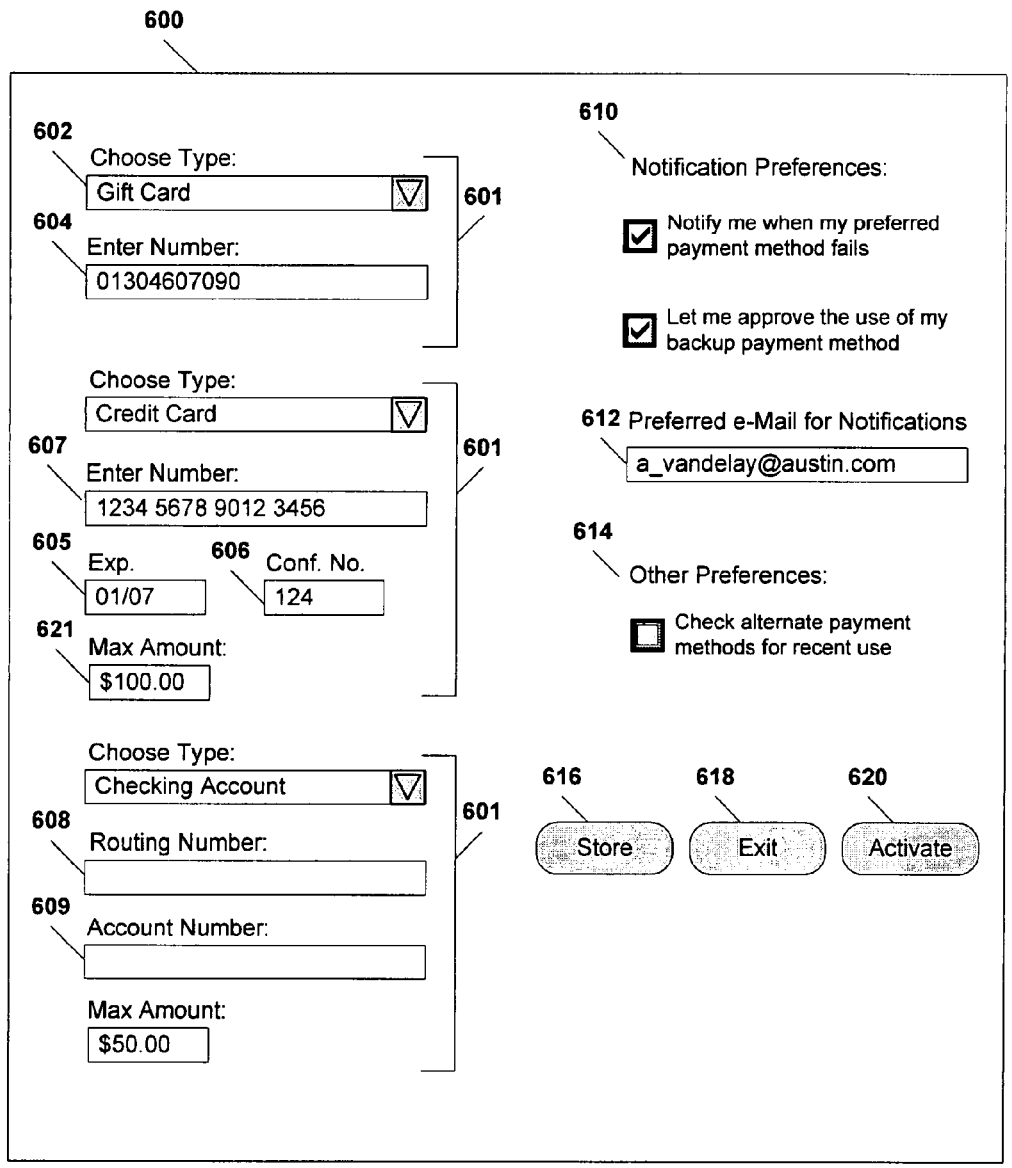
FIG. 6 is a diagram of a particular embodiment of a graphical user interface to create an electronic wallet.

In a particular embodiment, the memory 106 includes a GUI module 113 that is executable by the processor 104 to provide a first graphical user interface (GUI) via the seller website in response to a customer request to create an electronic wallet. An example of such a GUI is illustrated in FIG. 6. The GUI module 113 is executable by the processor 104 to receive data related to a plurality of financial instruments from the customer computer 122 via the first GUI, such as a gift card number, a gift certificate identifier, a credit card number, a credit card expiration date, a credit card confirmation number, a bank account number, a bank routing number, a debit card number, an online financial account identifier (e.g., PayPal® or BitPass®), payphrase information, other data related to a financial instrument, or any combination thereof.

In addition, the GUI module 113 is executable by the processor 104 to receive sequence data indicating a sequence related to the plurality of financial instruments. The sequence data indicates an order in which collection of a payment related to a transaction requested by the customer or other user via the seller website is to be requested from financial service providers associated with the plurality of financial instruments. In a particular embodiment, the sequence data indicates a sequence that includes all financial instruments in the customer's electronic wallet. Alternatively, the sequence data indicates a preferred financial instrument, a backup financial instrument, a default financial instrument, other designations of individual financial instruments, or any combination thereof.

Further, the GUI module 113 is executable by the processor 104 to receive data indicating activation or de-activation of the e-Wallet with respect to collecting payment for transactions. Moreover, the GUI module 113 is executable by the processor 104 to receive notification preference data and other preference data related to the use of the e-Wallet to collect payment for transactions requested by the customer via the seller website. The data related to the plurality of financial instruments, sequence data, activation/de-activation data, preference data, or any combination thereof, can be stored as an electronic wallet associated with a customer account at the customer account storage 109, the e-Wallet storage 111, or any combination thereof.

Figure 8:
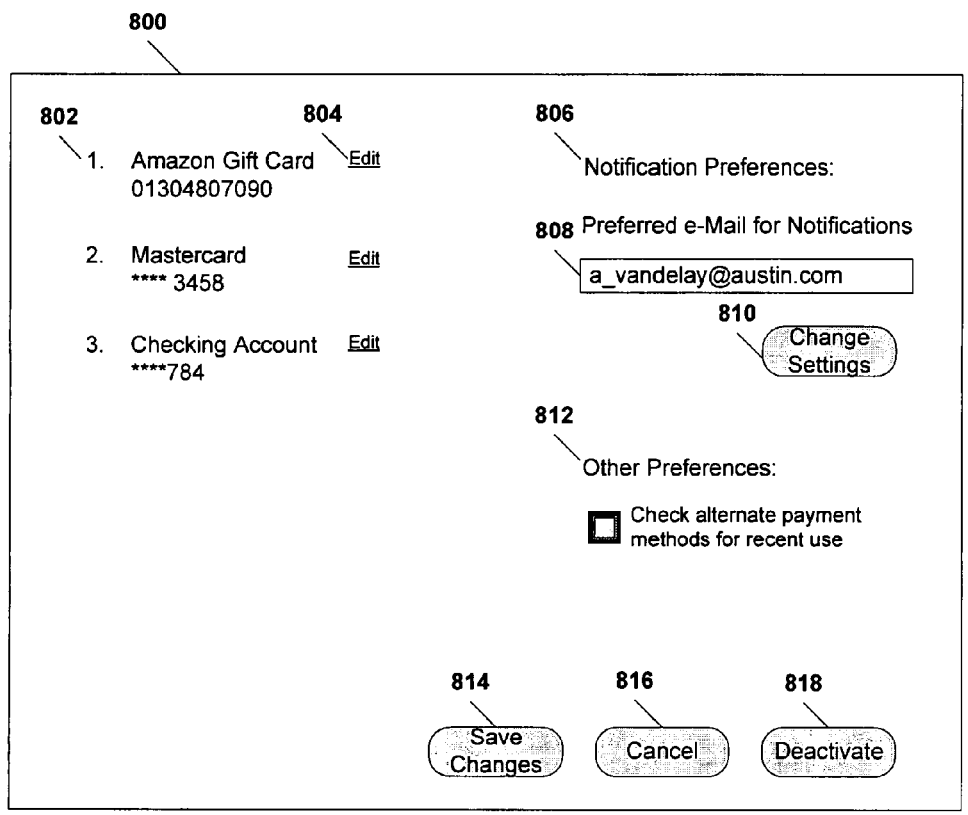
FIG. 8 is a diagram of a particular embodiment of a graphical user interface to modify data associated with an electronic wallet.

In a particular embodiment, the GUI module 113 is executable by the processor 104 to provide a second GUI via the seller website in response to a customer request to modify e-Wallet data. An example of a GUI to modify e-Wallet data is illustrated in FIG. 8. Modifications to the e-Wallet data can be stored at the customer account storage 109, the e-Wallet storage 111, alternate storage, or any combination thereof.

In a particular embodiment, the memory 106 includes a fraud detection module 114 that is executable by the processor 104 to verify whether each of a plurality of financial instruments associated with a customer account are valid to collect payment for a transaction. The fraud detection module 114 is executable by the processor 104 to verify, for example, whether each of the plurality of financial instruments is registered in a name associated with the customer account. Further, the fraud detection module 114 is executable by the processor 104 to verify that at least part of an address associated with the customer account matches with at least part of an address stored by a financial service provider corresponding to each of the plurality of financial instruments. Moreover, the fraud detection module 114 is executable by the processor 104 to verify whether a customer has instructed a financial service provider corresponding to any of the plurality of financial instruments to block online transactions using the financial instrument. The fraud detection module 114 is executable by the processor 104 to conduct fraud detection processes with respect to the plurality of financial instruments after a payment is denied by a first financial service provider; during e-Wallet creation or modification; before activation of a feature related to collecting payments associated with transactions; before accepting the use of a financial instrument for a particular transaction; or any combination thereof.

Figure 2:
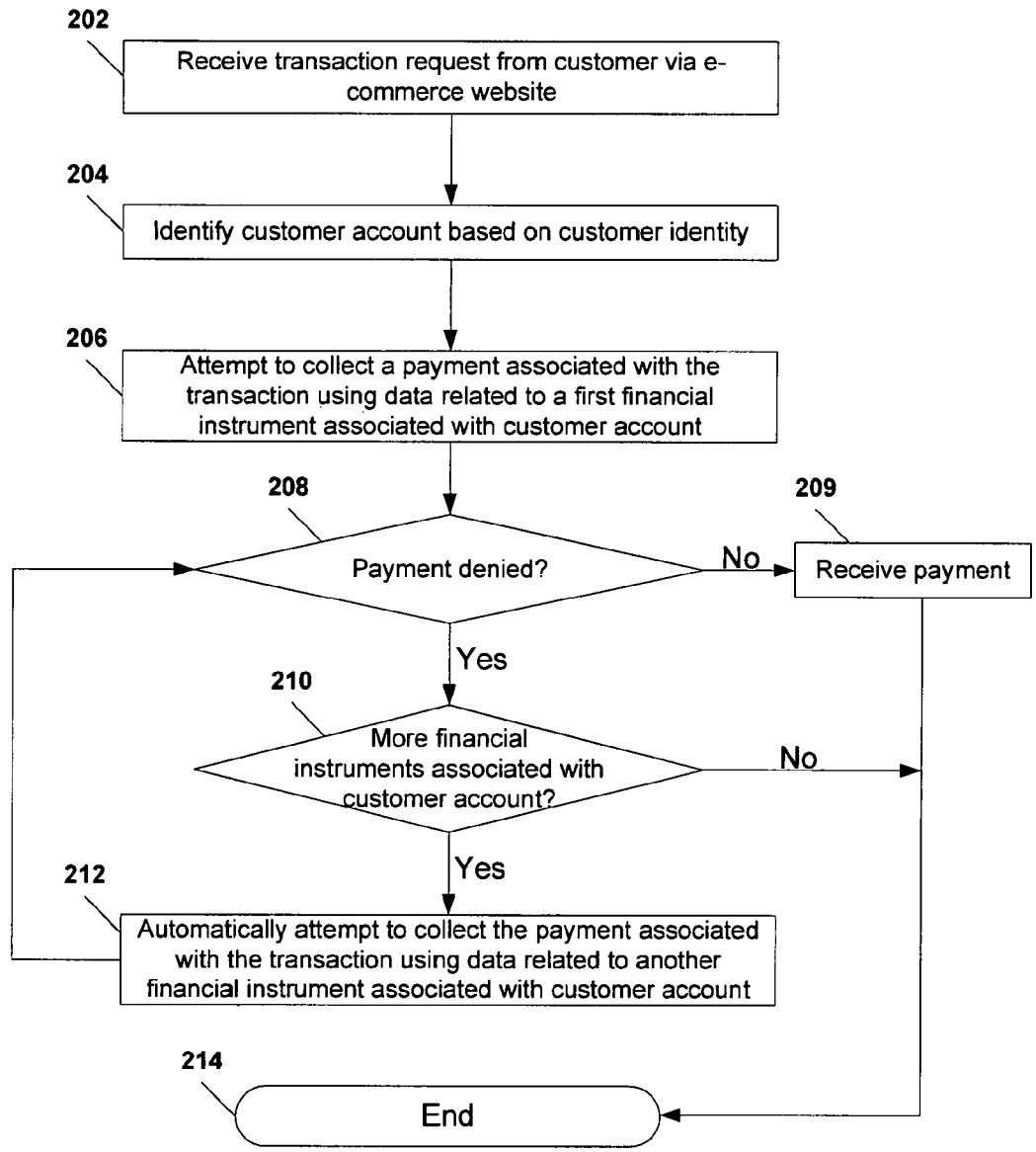
FIG. 2 is a flow diagram of a particular embodiment of a method of fulfilling a transaction.

Referring to FIG. 2, a particular embodiment of a method of fulfilling a transaction is illustrated. At block 202, a transaction request is received from a customer at a server system of a seller via an electronic commerce website. Moving to block 204, the server system identifies a customer account based on an identity of the customer. In one embodiment, the customer identity is determined based on identification information requested and received from the customer or based on information related to a computing device or Internet connection from which the transaction request is received.

Proceeding to block 206, the server system attempts to collect a particular payment associated with the requested transaction using data related to a first financial instrument associated with the identified customer account. The first financial instrument can be pre-selected by the customer. In one embodiment, the server system sends a request for the payment to a first financial service provider corresponding to the first financial instrument via a financial network. The payment can be substantially contemporaneous with, or subsequent to, the transaction request. For instance, the payment can be a single payment, an initial payment, one of multiple installments or subscription payments, a renewal payment, an auto-renewal payment, another type of payment, or any combination thereof.

Continuing to decision node 208, the server system determines whether the payment has been denied by the first financial service provider. For example, a system of the financial service provider sends data indicating denial of the payment in response to a request for payment sent by the server system. If the server system determines that the payment has not been denied, the method moves to block 209, and payment is received by the server system. In a particular embodiment, the server system distributes monies associated with the payment among one or more accounts, such as an account of the seller associated with the e-commerce website, an account of a third party offering a good, service, subscription, or auction item via the e-commerce website, another account, or any combination thereof.

Returning to decision node 208, if the server system determines that the first financial provider has denied the payment, or if the payment is denied due to another limitation, such as a customer-imposed maximum per purchase amount or maximum total purchases amount, the method proceeds to decision node 210, and the server system determines whether more financial instruments are associated with the customer account. For example, the server system stores data related to one or more financial instruments that have been used by the customer to pay for one or more other transactions via the seller website. In another example, an electronic wallet is associated with the customer account and includes data related to a plurality of financial instruments having a customer-specific sequence that includes at least a first financial instrument pre-selected by the customer and a second financial instrument pre-selected by the customer. If no other financial instruments are associated with the customer account, the method terminates at 214. In an alternative embodiment, if no other financial instruments are associated with the customer account, the server system tries to collect payment from the first financial provider again at a pre-defined time interval up to a maximum number of tries. For example, the server system can retry such payment collection once per day, up to three times.

Conversely, if at least one other financial instrument is associated with the customer account, the method continues to block 212, and the server system automatically attempts to collect the particular payment associated with the transaction using data related to another financial instrument associated with the customer account, such as the second financial instrument. The method returns to block 208, and the server system determines whether payment is received. In a particular embodiment, the server system attempts to collect the payment using data related to other financial instruments associated with the customer account until payment is received or until all of the plurality of financial instruments, or a pre-determined number of the plurality of financial instruments, have been exhausted. The method terminates at 214.

Figure 3:
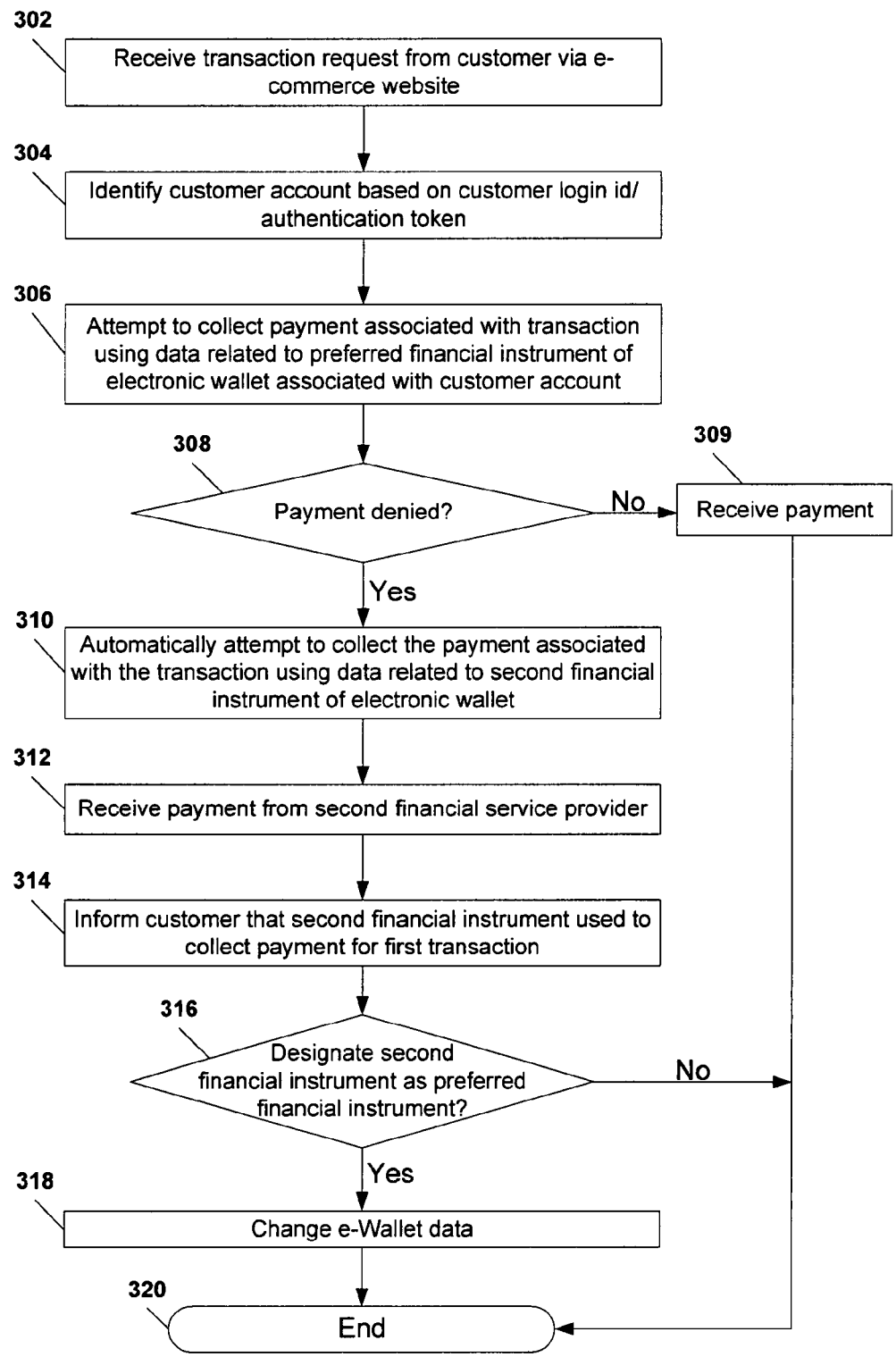
FIG. 3 is a flow diagram of a second particular embodiment of a method of fulfilling a transaction.

Referring to FIG. 3, a second particular embodiment of a method of fulfilling a transaction is illustrated. At block 302, a transaction request is received from a customer at a server system via an electronic commerce website. Moving to block 304, in an illustrative embodiment, the server system identifies a customer account based on login identification information and an authentication token received from the customer. Proceeding to block 306, the server system attempts to collect a payment associated with the requested transaction using data related to a preferred financial instrument pre-selected by the customer as part of an electronic wallet associated with the identified customer account. In an illustrative embodiment, the server system sends a request for the payment to a first financial service provider corresponding to the preferred financial instrument via a financial network.

Continuing to decision node 308, the server system determines whether the payment has been denied by the first financial service provider. If the server system determines that the payment has not been denied, the method moves to block 309, and payment is received by the server system. On the other hand, if the server system determines that data indicating a denial of the payment has been received from the first financial provider, the method proceeds to block 310. At block 310, the server system automatically attempts to collect the payment associated with the transaction using data related to a second financial instrument associated with the electronic wallet, such as a backup financial instrument, a default financial instrument, or a financial instrument pre-selected by the customer as second in a customer-specific sequence of financial instruments associated with the electronic wallet.

Advancing to block 312, in a particular embodiment, the payment is received from the second financial service provider. Moving to block 314, in an illustrative embodiment, the server system informs the customer that the second financial instrument has been used to collect the payment associated with the transaction. For example, the server system sends an e-mail message to an e-mail address associated with the customer account. Proceeding to decision node 316, in a non-limiting embodiment, the server system determines whether it has received a command to designate the second financial instrument as the preferred financial instrument for future payments. For instance, an e-mail sent by the server system to the customer e-mail address includes a selectable indicator, such as a one-click indicator, of an option to modify the electronic wallet to select the second financial instrument as the preferred financial instrument. If the server system determines that it has received such a command, the method proceeds to block 318, and the server system can change the electronic wallet data to designate the second financial instrument as the preferred financial instrument. The method terminates at 320.

Figure 4:
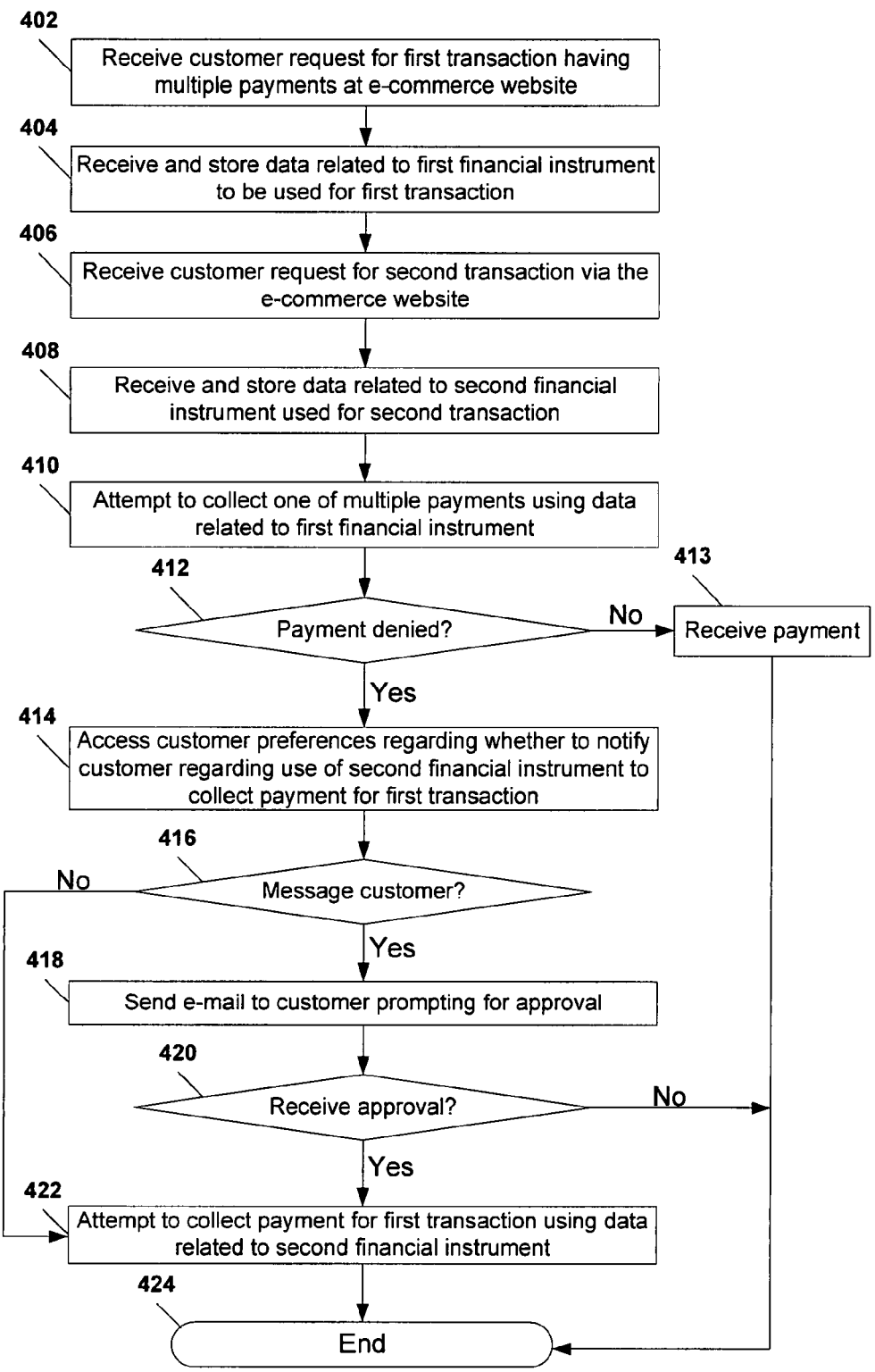
FIG. 4 is a flow diagram of a third particular embodiment of a method of fulfilling a transaction.

Referring to FIG. 4, a third particular embodiment of a method of fulfilling a transaction is illustrated. At block 402, a customer request for a first transaction is received at a server system of a seller via an electronic commerce website. In a particular embodiment, the first transaction corresponds to a first offering of the electronic commerce website, such as a membership service. In one embodiment, multiple payments, such as multiple installment payments, subscription payments, renewal payments, or other payments, are associated with the first transaction. Moving to block 404, the server system receives and stores data from the customer related to a first financial instrument to be used for the multiple payments associated with the first transaction.

Proceeding to block 406, the server system receives a customer request for a second transaction via the e-commerce website. In a particular embodiment, the second transaction corresponds to a second offering of the electronic commerce website, such as a product. The customer request for the second transaction can be made during a session in which the request for the first transaction was made or during a subsequent session. Continuing to block 408, the server system receives and stores data from the customer related to a second financial instrument to be used for one or more payments associated with the second transaction.

Moving to block 410, at a first time, the server system attempts to collect a particular payment of the multiple payments, such as a renewal payment, associated with the first transaction using data related to the first financial instrument. In an illustrative embodiment, the server system sends a request for the particular payment to a first financial service provider corresponding to the first financial instrument via a financial network. Moving to decision node 412, the server system determines whether the particular payment has been denied by the first financial service provider. If the server system determines that the particular payment has not been denied, the method moves to block 413, and the particular payment is received by the server system.

On the other hand, if the server system determines that it has received data indicating a denial of the particular payment, the method proceeds to block 414. At block 414, in a particular embodiment, the server system accesses customer preferences regarding whether the customer is to be notified regarding the use of the second financial instrument to collect the particular payment related to the first transaction. Moving to decision node 416, the server system determines whether to send a message to the customer based on the customer preferences. If the server system determines that a message is not to be sent to the customer, the method proceeds to block 422, and the server system automatically attempts, at a second time, to collect the particular payment using data related to the second financial instrument. For instance, the server system retrieves the data related to the second financial instrument, which was originally received in connection with the second transaction, from a memory at the server system and sends a request for the particular payment to a second financial service provider corresponding to the second financial instrument.

Returning to decision node 416, if the server system determines that a message is to be sent to the customer, the method advances to block 418, and the server system sends an e-mail or other message to the customer prompting for approval to collect the payment using data related to the second financial instrument. Proceeding to decision node 420, the server system determines whether it has received an approval in response to the e-mail or other message. If the server system determines that it has received such an approval, the method proceeds to block 422, and the server system attempts to collect the payment for the first transaction using data related to the second financial instrument. The method terminates at 424.

Figure 5:
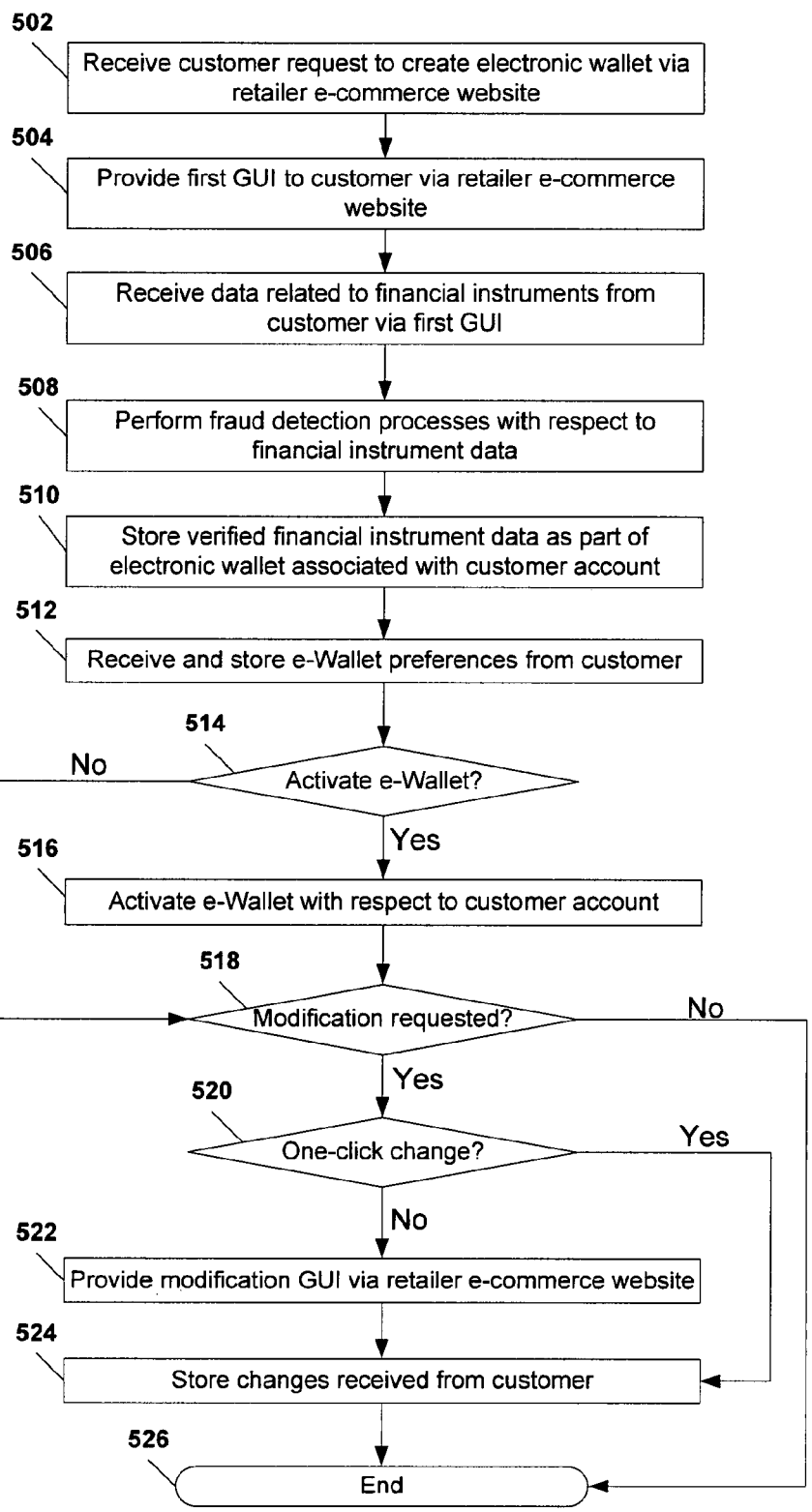
FIG. 5 is a flow diagram of a fourth particular embodiment of a method of fulfilling a transaction.

Referring to FIG. 5, a fourth particular embodiment of a method of fulfilling a transaction is illustrated. At block 502, a customer request to create an electronic wallet is received at a server system via an electronic commerce website. Moving to block 504, the server system provides a first graphical user interface (GUI) via the e-commerce website. The first GUI is adapted to receive data from a customer to create an electronic wallet. In an illustrative embodiment, the server system prompts the customer for authentication information before providing the first GUI. Proceeding to block 506, the server system receives data via the first GUI related to a plurality of financial instruments to be used to collect payments for transactions requested via the e-commerce website. In a particular embodiment, the data also indicates a customer-specific sequence in which data related to each of the plurality of financial instruments is to be used to attempt collection of such payments. In another particular embodiment, the data indicates designations of particular financial instruments as preferred, default, backup, or other designations.

Continuing to block 508, in an illustrative embodiment, the server system performs one or more fraud detection processes to verify that the customer may use each of the plurality of financial instruments to pay for transactions via the website. The server system verifies, for example, whether each of the plurality of financial instruments is registered in a name associated with the customer account; whether at least part of an address associated with the customer account matches with at least part of an address stored by a financial service provider corresponding to each of the plurality of financial instruments; whether a customer has instructed a financial service provider corresponding to any of the plurality of financial instruments to block online transactions using the financial instrument; whether other information indicates potential fraud or misuse of any of the plurality of financial instruments; or any combination thereof.

At block 510, the server system stores verified financial instrument data as part of an electronic wallet associated with the customer's account with the website. In an illustrative embodiment, the server system may inform the customer of financial instrument data that could not be verified and allows the customer to alter the non-verified data. Moving to block 512, the server system receives and store notification preferences and other preferences with respect to the electronic wallet. Proceeding to decision node 514, the server system determines whether it has received a command to activate the electronic wallet with respect to transactions associated with the customer account. For instance, the first GUI includes a selectable indicator of an option to activate the electronic wallet feature. If the server system determines that it has not received a command to activate the electronic wallet, the method proceeds to decision node 518. Conversely, if the server system determines that it has received an activation command, the method continues to block 516, and the electronic wallet created by the customer can be activated. The method then proceeds to decision node 518.

At decision node 518, the server system determines whether it has received a request from a customer to modify an electronic wallet. The request to modify the electronic wallet is received during a same session in which the electronic wallet was created or in a subsequent session. If the server system determines that it has not received such a request, the method terminates at 526. On the other hand, if the server system determines that it has received a request to modify an electronic wallet, the method advances to decision node 520, and the server system determines whether the modification request is a one-click change command received in response to an e-mail or other message sent to the customer. If the server system determines that the modification request is a one-click command, the method proceeds to block 524, and the server system stores changes to the electronic wallet data based on the change associated with the one-click command, such as making a second financial instrument a preferred financial instrument. Returning to decision node 520, if the server system determines that the modification request is not a one-click command, such as a selection of an electronic wallet modification indicator displayed at the e-commerce website, the method proceeds to block 522, and the server system provides a second GUI adapted to receive changes to electronic wallet data via the website. The method then moves to block 524, and the server system stores changes to the electronic wallet data that are received from the customer via the second GUI. The method terminates at 526.

Referring to FIG. 6, a particular embodiment of a graphical user interface (GUI) to create an electronic wallet is illustrated and designated generally 600. The GUI 600 includes data entry regions to receive data related to a plurality of financial instruments. In a non-limiting embodiment, the data regions are represented as a plurality of virtual slots 601 of the electronic wallet. The data entry regions include a plurality of drop-down or pull-down menus 602 that include selectable financial instrument types, such as 'Gift Card,' 'Credit Card,' 'Checking Account,' 'Savings Account,' 'Debit Card,' 'Pay Phrase,' other financial instrument types, or any combination thereof. Selection of a financial instrument type causes the GUI 600 to display various fields related to the type of financial instrument selected.

For example, selection of 'Gift Card'" causes a field 604 to be displayed via the GUI 600, in which a gift card number or other identifier can be entered. In another example, selection of 'Credit Card' causes the GUI 600 to display a field 605 in which a credit card expiration date is entered and a field 606 in which a confirmation number is entered, in addition to a field 607 in which the credit card number is entered. In a particular embodiment, a maximum amount field 621, in which a customer can enter a maximum per purchase amount or maximum total purchase amount can be displayed. In another example, selection of 'Checking Account' causes the GUI 600 to display a field 608 in which a bank routing number is entered and a field 609 in which a checking account number is entered.

In an illustrative, non-limiting embodiment, the order in which the financial instrument data entry fields are displayed (e.g., top to bottom) indicates an order in which data related to the financial instruments will be used to attempt to collect payment for transactions. In another embodiment, a rank field (not shown) is displayed by the GUI 600 near the data related to each financial instrument, and the customer enters or selects a rank or other designation for each financial instrument, such as first, second, third, or alternatively, preferred, default, backup.

The GUI 600 includes a region 610 to allow the customer to set notification preferences, such as whether to notify the customer when a preferred payment method fails or whether to let the customer approve the use of a backup or other financial instrument before payment is collected using the backup or other financial instrument. In addition, the GUI 600 includes a field 612 in which the customer enters a preferred e-mail address for notifications. Further, the GUI 600 includes a region 614 to select other preferences, such as whether the seller system should check for recent successful uses of a backup or other financial instrument before attempting to collect a payment using data related to the backup or other financial instrument.

The GUI 600 includes a selectable indicator 616 of an option to store data entered via the GUI 600. For example, a customer stores the data entered via the GUI 600 as part of an electronic wallet, without activating the electronic wallet with respect to transactions that the customer requests. The GUI 600 can also include a selectable indicator 618 of an option to exit the GUI 600. Additionally, the GUI 600 includes a selectable indicator 620 of an option to activate the electronic wallet.

Referring to FIG. 7, a particular embodiment of a notification message is illustrated and designated generally 700. The notification message 700 includes message text 702 indicating that a financial instrument other than a first financial instrument has been used to collect a payment denied by a first financial provider corresponding to a first financial instrument with respect to a transaction requested by a customer to whom the notification message 700 is sent. The notification message 700 includes text 704 indicating an option to change the financial instrument used to collect the payment to a first or preferred financial instrument associated with the customer's account. The notification message 700 includes a selectable indicator 706 to make such a change to the customer account, such as a virtual button that may be clicked once using a mouse to make the change. The notification message 700 also includes a selectable indicator 708 of an option to access the customer account to view the transaction, view financial instrument data associated with the customer account, change such data, or any combination thereof.

Referring to FIG. 8, a particular embodiment of a graphical user interface (GUI) to modify electronic wallet data is illustrated and designated generally 800. The GUI 800 includes a list 802 or other display of financial instrument data associated with the electronic wallet that is to be modified. The list 802 indicates a customer-specific sequence of the financial instruments associated with the electronic wallet. The GUI 800 includes selectable indicators 804 of options to edit data related to each of the financial instruments displayed by the list 802. The GUI 800 also includes a region 806 to change notification preferences, which may include, for example, a field 808 to alter the customer's preferred e-mail address, a selectable indicator to change notification settings, or any combination thereof. The GUI 800 includes a region 812 to alter other preferences.

In addition, the GUI 800 includes a selectable indicator 814 of an option to save changes entered via the GUI 800. The GUI 800 can also include a selectable indicator 816 of an option to cancel changes and exit the GUI 800. Additionally, the GUI 800 includes a selectable indicator 818 of an option to de-activate the electronic wallet if it was previously activated, or to activate the electronic wallet if it was previously de-activated.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method comprising:
    under control of a configured server computer system associated with an electronic commerce website of a retailer, providing information for a graphical user interface (GUI) that enables customers of the retailer to create electronic wallets for use in later transactions with the electronic commerce website;
    creating, by the configured server computer system, a first electronic wallet for a first customer by:
        receiving information from the first customer that is specified via the GUI, the received information designating a plurality of financial instruments for the first customer and indicating a designated sequence of the plurality of financial instruments; and
        storing the received information from the first customer as part of the created first electronic wallet, to enable payment for later transactions by the first customer with the electronic commerce website to be obtained using the stored information for the created first electronic wallet; and
    after the creating of the first electronic wallet for the first customer:
        receiving, by the configured server computer system, an indication of a first transaction involving the first customer purchasing a first product from the electronic commerce website;
        retrieving, by the configured server computer system, the stored information for the created first electronic wallet of the first customer, the stored information indicating the designated sequence of the designated plurality of financial instruments for the first customer, the designated sequence including at least a first financial instrument that is first in the designated sequence and a distinct second financial instrument that is second in the designated sequence;
        automatically attempting, by the configured server computer system, to obtain payment for the first transaction using the first financial instrument in the designated sequence of the designated plurality of financial instruments for the first customer; and
        if the attempting to obtain the payment for the first transaction using the first financial instrument does not succeed, attempting, by the configured server computer system, to obtain the payment for the first transaction using the second financial instrument in the designated sequence of the designated plurality of financial instruments for the first customer.

2. The method of claim 1 wherein the attempting to obtain the payment for the first transaction using the first financial instrument does not succeed based at least in part on a failure event that occurs with respect to the attempting to obtain the payment using the first financial instrument.

3. The method of claim 2 wherein the failure event includes receiving data indicating at least one of the first financial instrument having expired, of the first financial instrument having been reported lost, of the first financial instrument having been reported stolen, of the first financial instrument having been canceled, of the first financial instrument having exceeded a spending limit, and of the first financial instrument having been restricted to prevent use with online transactions.

4. The method of claim 1 wherein the first transaction includes a plurality of periodic payments.

5. The method of claim 4 wherein the plurality of periodic payments corresponds to an installment payment plan for the first product.

6. The method of claim 1 wherein the GUI includes a selectable indicator to enable activation of a created electronic wallet, wherein the retrieved stored information for the created first electronic wallet of the first customer includes an indication that the created first electronic wallet for the first customer is activated based on the first customer having previously selected the selectable indicator, and wherein the automatic attempting to obtain the payment for the first transaction using the first financial instrument is performed based on the indication in the retrieved stored information that the created first electronic wallet for the first customer is activated.

7. The method of claim 6 wherein the GUI further includes a second selectable indicator to enable de-activation of an activated electronic wallet, and wherein the method further comprises:
after the automatic attempting to obtain the payment for the first transaction using the first financial instrument, receiving information about selection by the first customer of the second selectable indicator, and updating the stored information for the created first electronic wallet of the first customer to include an indication that the created first electronic wallet for the first customer is de-activated;
after the updating of the stored information for the created first electronic wallet of the first customer to include the indication that the created first electronic wallet for the first customer is de-activated, receiving an indication of a second transaction involving the first customer purchasing a second product from the electronic commerce website; and
querying the first customer to obtain payment information for the second transaction rather than using the created first electronic wallet of the first customer based at least in part on the included indication that the created first electronic wallet for the first customer is de-activated.

8. The method of claim 6 further comprising:
receiving an indication of a second transaction involving a second customer purchasing a second product from the electronic commerce website;
retrieving stored second information for a created second electronic wallet of the second customer, the stored second information lacking an indication that the created second electronic wallet for the second customer is activated based on the second customer having previously selected the selectable indicator; and
querying the second customer to obtain payment information for the second transaction rather than using the created second electronic wallet of the second customer based at least in part on the lack of the indication that the created second electronic wallet for the second customer is activated.

9. The method of claim 1 wherein the GUI enables customers to set a notification preference to be notified if payment using a financial instrument fails, wherein the retrieved stored information for the created first electronic wallet of the first customer includes an indication that the first customer previously set the notification preference, wherein the automatic attempting to obtain the payment for the first transaction using the first financial instrument fails, and wherein the method further comprises automatically providing notification to the first customer that the automatic attempting to obtain the payment for the first transaction using the first financial instrument has failed based at least in part on the previously set notification preference.

10. The method of claim 1 wherein the GUI enables customers to set a notification preference to be notified to approve use of a payment instrument that is not first in a designated sequence if payment using a financial instrument earlier in the designated sequence fails, wherein the automatic attempting to obtain the payment for the first transaction using the first financial instrument fails, and wherein the method further comprises, before the attempting to obtain the payment for the first transaction using the second financial instrument, automatically providing notification to the first customer to approve use of the second financial instruction and receiving an approval response from the first customer.

11. The method of claim 1 wherein the GUI enables customers to designate a maximum amount for each financial instrument, the designated maximum amount being at least one of a maximum per purchase amount and a maximum total purchase amount, wherein the retrieved stored information for the created first electronic wallet of the first customer includes an indication that the first customer previously provided a designated maximum amount for the first financial instrument, and wherein the automatic attempting to obtain the payment for the first transaction using the first financial instrument fails based on an amount of the payment exceeding the designated maximum amount for the first financial instrument.

12. The method of claim 1 further comprising, after the creating of the first electronic wallet, performing at least one fraud detection procedure with respect to at least one of the designated plurality of financial instruments for the first customer.

13. The method of claim 12 wherein the at least one fraud detection procedure includes at least one of determining whether each of the at least one financial instruments is registered in a name of the first customer, of determining whether at least part of an address received from the first customer matches at least part of a billing address maintained by a financial service provider associated with each of the at least one financial instruments, of determining whether identification data received from the first customer matches identification data maintained by the financial service provider associated with each of the at least one financial instruments, and of determining whether each of the at least one financial instruments is subject to an online transaction restriction.

14. A computer system comprising:
one or more processors; and
one or more modules configured to, when executed by at least one of the one or more processors:
receive information from a customer of a seller that is specified via a graphical user interface (GUI) provided by the seller, the received information indicating a designated plurality of financial instruments for the customer and corresponding to a designated sequence of the designated plurality of financial instruments;
initiate storing of the received information from the customer for use with one or more later transactions by the customer with the seller, the stored received information enabling payment for the later transactions to be obtained using the stored received information, wherein the initiating of the storing of the received information from the customer includes creating an electronic wallet for the customer that includes stored information about the designated sequence of the designated plurality of financial instruments for the customer; and after the creating of the electronic wallet for the customer, use the created electronic wallet to obtain the payment for the later transactions by the customer with the seller, the using of the created electronic wallet including, for one of the later transactions:

receiving an indication of the transaction, the transaction involving the customer purchasing a product from the seller;

retrieving the stored information for the created electronic wallet of the customer, the stored information indicating the designated sequence of the designated plurality of financial instruments for the customer, the designated sequence including at least a first financial instrument that is first in the designated sequence and a distinct second financial instrument that is second in the designated sequence;

automatically attempting to obtain payment for the transaction using the first financial instrument in the designated sequence of the designated plurality of financial instruments for the customer; and if the attempting to obtain the payment for the transaction using the first financial instrument does not succeed, attempting to obtain the payment for the transaction using the second financial instrument in the designated sequence of the designated plurality of financial instruments for the customer.

15. The computer system of claim 14 wherein the seller is a retailer who has an electronic commerce website that offers a plurality of products, and wherein the computer system is a server computer system operated by the retailer.

16. The computer system of claim 15 wherein the one or more modules are further configured to provide the GUI to multiple customers of the retailer to enable the multiple customers to create electronic wallets for use in later transactions with the electronic commerce website.

17. The computer system of claim 14 wherein the attempting to obtain the payment for the transaction using the first financial instrument does not succeed based at least in part on a failure event that occurs with respect to the attempting to obtain the payment using the first financial instrument, the failure event including receiving data indicating at least one of the first financial instrument having expired, of the first financial instrument having been reported lost, of the first financial instrument having been reported stolen, of the first financial instrument having been canceled, of the first financial instrument having exceeded a spending limit, and of the first financial instrument having been restricted to prevent use with online transactions.

18. The computer system of claim 14 wherein the transaction includes a plurality of periodic payments.

19. The computer system of claim 14 wherein the GUI includes a selectable indicator to enable activation of the created electronic wallet of the customer, wherein the retrieved stored information for the created electronic wallet of the customer includes an indication that the created electronic wallet for the customer is activated based on the customer having previously selected the selectable indicator, and wherein the automatic attempting to obtain the payment for the transaction using the first financial instrument is performed based on the indication in the retrieved stored information that the created electronic wallet for the customer is activated.

20. The computer system of claim 19 wherein the GUI further includes a second selectable indicator to enable de-activation of an activated electronic wallet, and wherein one or more modules are further configured to:

after the automatic attempting to obtain the payment for the transaction using the first financial instrument, receive information about selection by the customer of the second selectable indicator, and update the stored information for the created electronic wallet of the customer to include an indication that the created electronic wallet for the customer is de-activated;

after the updating of the stored information for the created electronic wallet of the customer to include the indication that the created electronic wallet for the customer is de-activated, receive an indication of a second transaction involving the customer purchasing a second product from the seller; and obtain payment information for the second transaction from the customer as part of the second transaction rather than using the created electronic wallet of the customer based at least in part on the included indication that the created electronic wallet for the customer is de-activated.

21. The computer system of claim 14 wherein the automatic attempting to obtain the payment for the transaction using the first financial instrument fails, and wherein the one or more modules are further configured to automatically provide notification to the customer that the automatic attempting to obtain the payment for the transaction using the first financial instrument has failed.

22. The computer system of claim 14 wherein the automatic attempting to obtain the payment for the transaction using the first financial instrument fails, and wherein the one or more modules are further configured to, before the attempting to obtain the payment for the transaction using the second financial instrument, automatically provide notification to the customer to approve use of the second financial instruction and receive an approval response from the customer.

23. The computer system of claim 14 wherein the automatic attempting to obtain the payment for the transaction using the first financial instrument fails based on an amount of the payment exceeding a designated maximum amount for the first financial instrument.

24. The computer system of claim 14 wherein the computer system is a computer system of the customer, and wherein the one or more modules are further configured to display the GUI on the computer system.

25. The computer system of claim 14 wherein the seller is a wholesaler.

26. The computer system of claim 14 wherein the seller has a website that displays offers for one or more of products, services, auctions and subscriptions.

* * * * *

UNITED STATES PATENT AND TRADEMARK OFFICE
CERTIFICATE OF CORRECTION

| | | |
|---|---|---|
| PATENT NO. | : 8,370,264 B1 | Page 1 of 1 |
| APPLICATION NO. | : 13/151153 | |
| DATED | : February 5, 2013 | |
| INVENTOR(S) | : Danny Wei et al. | |

It is certified that error appears in the above-identified patent and that said Letters Patent is hereby corrected as shown below:

Title page 2, line 10, Item (56):
"Smart Computing – Using CyberCash, Banking, September 1999, vol. 5, Issue 9, retrieved on August 13, 2009, from http://www.smartcomput-ing.com/Editorial/article.asp?article=article..., 5 pages."
should read, --Smart Computing – Using CyberCash, Banking, September 1999, vol. 5, Issue 9, retrieved on August 13, 2009, from http://www.smartcomputing.com/Editorial/article.asp?article=article..., 5 pages.--.

Signed and Sealed this
Third Day of September, 2013

Teresa Stanek Rea
*Acting Director of the United States Patent and Trademark Office*